United States Patent [19]

Haas et al.

[11] Patent Number: 4,896,929

[45] Date of Patent: Jan. 30, 1990

[54] HOLOGRAPHIC DISPLAY MODULE FOR DISPLAYING MACHINE STATUS

[75] Inventors: Werner E. Haas, Webster; John R. Andrews, Fairport; Kirk A. Blakesley, Newark; John L. Havranek, Williamson; Leon E. Kawacz, Rochester; Raymond P. Mileski, Fairport; Michael D. Rainsdon, Walworth; Andrew P. Yesul, Jr., Penfield; George A. Muller, Pittsford, all of N.Y.

[73] Assignee: Xerox Corporation, Stamford, Conn.

[21] Appl. No.: 219,120

[22] Filed: Jul. 15, 1988

[51] Int. Cl.⁴ .............................. G03H 1/22
[52] U.S. Cl. ........................ 350/3.85; 350/3.6; 355/2; 340/715
[58] Field of Search ............ 350/3.6, 3.69, 3.75, 350/3.77, 3.85; 355/2; 340/705, 715, 729

[56] References Cited

U.S. PATENT DOCUMENTS

| | | | |
|---|---|---|---|
| 3,915,548 | 10/1975 | Opittek et al. | 350/3.5 |
| 4,372,639 | 2/1983 | Johnson | 350/3.7 |
| 4,475,806 | 10/1984 | Daughton et al. | 355/14 R |
| 4,506,956 | 3/1985 | Dir | 350/339 F |
| 4,527,864 | 7/1985 | Dir | 350/337 |
| 4,594,572 | 6/1986 | Haubner et al. | 340/715 |
| 4,609,919 | 9/1986 | Miyazaki et al. | 340/715 |
| 4,730,881 | 3/1988 | Taguchi et al. | 350/3.85 |
| 4,790,613 | 12/1988 | Moss | 350/3.85 |
| 4,795,223 | 1/1989 | Moss | 350/3.77 |

FOREIGN PATENT DOCUMENTS

| | | | |
|---|---|---|---|
| 3120601 | 3/1981 | Fed. Rep. of Germany | 340/705 |
| 3324592 | 1/1984 | Fed. Rep. of Germany | 340/715 |

OTHER PUBLICATIONS

"Holographic Stereograms Generated With a Liquid Crystal Spatial Light Modulator", J. R. Andrews et al., SPIE, Jan. 1988.

Primary Examiner—Bruce Y. Arnold
Assistant Examiner—R. D. Shafer

[57] ABSTRACT

A holographic display module is incorporated into a machine with independently operating subsystems, and used to provide an indication of the status or location of the machine subsystems. In one embodiment, a xerographic copier incorporates a holographic display incorporating an outline of the machine. A liquid crystal panel is aligned with the holographic display and selectively addressed in conjunction with signals from the copier subsystems. An illumination subsystem is optimized to provide diffuse illumination of the display.

5 Claims, 7 Drawing Sheets

HOLOGRAPHIC DISPLAY MODULE FOR DISPLAYING MACHINE STATUS

BACKGROUND AND INFORMATION DISCLOSURE STATEMENT

The present invention relates to a holographic display and, more specifically, to a holographic display module incorporated into a machine which provides a visual, three-dimensional display alerting and prompting a user of machine status and/or malfunctions.

Visual display panels for communicating the status of a machine to an operator are well known in the art. Displays are used, for example, to provide alphanumeric information relating to conditions in a document reproduction machine; e.g. "COPY SELECT", "STANDBY", "READY", and the like. Graphic displays which illustrate a machine configuration in conjunction with "mimic" components are also known. As one example, U.S. Pat. No. 4,475,806, assigned to the same assignee as the present invention, discloses a liquid crystal display wherein selectively energizable liquid crystal elements corresponding to copier components are rendered visible under the control of a microprocessor. An overlay pattern is placed above the liquid crystal display to present to the user in outline form the copier architecture with which he is interacting. Graphic types of panel displays have been incorporated into commercial machines such as the Xerox 1090 and Xerox 1065 copiers.

These prior art device display panels present two-dimensional configurations and are thus limited in providing information relating to internal areas of a machine. Moreover, with these prior art displays, a user must therefore be in a precisely defined visual orientation with the display to obtain an undistorted view. A panel providing three-dimensional information would overcome these prior art disadvantages. Holographic displays, used in "head's-up" displays for aircraft are known in the art as exemplified by the disclosure in U.S. Pat. No. 3,915,548. As described in this patent, a holographic array functions as both a collimating lens and a combiner for a light image from a liquid crystal source. In U.S. Pat. No. 4,372,639 a holographic element diffuser is combined with a liquid crystal panel to provide a display panel with improved brightness and viewability. A hologram has been combined with an electronically driven two layered crystal diode array in a game configuration as disclosed in an article entitled "Mass produced holograms for the entertainment industry" by Stephen P. McGrew, published January 1983 in the Proceedings of SPIE, Volume 391, pages 19 and 20. These prior art holographic displays incorporate designs and functions which are not suitable or transferable to the different requirements of a graphic-type display to represent machine components and functions. With particular reference to the aforementioned document, reproduction machine factors such as space limitations, manufacturing assembly procedures, focusing requirements, costs, etc. have hitherto proved to be an impediment to incorporating a holographic display in a xerographic copier. The present invention is therefore directed, in a first embodiment, to a display module which utilizes an addressable liquid crystal panel in conjunction with a nonlens holographic plate without focal power having formed thereon a three-dimensional image of the particular machine. The display module incorporates an illumination system which optimizes illumination of the holographic plate. In a second embodiment, a plurality of separate light sources are located in a substrate adjacent the holographic plate. The light source is selectively energized to illuminate the selected locations of the machine. More particularly, the invention relates to a machine having a plurality of operating subsystems, a holographic display system for providing to an operator of said machine a holographic visual display relating to the status of various machine operations, said display system comprising, in combination:

a holographic display element having formed thereon a holographic representation of a machine outline, illumination means for providing illumination to selected areas of said display element, and control circuitry for detecting a particular machine operation status, and for energizing said illumination means so as to illuminate said holographic display element.

DESCRIPTION OF THE INVENTION

Figure 1:
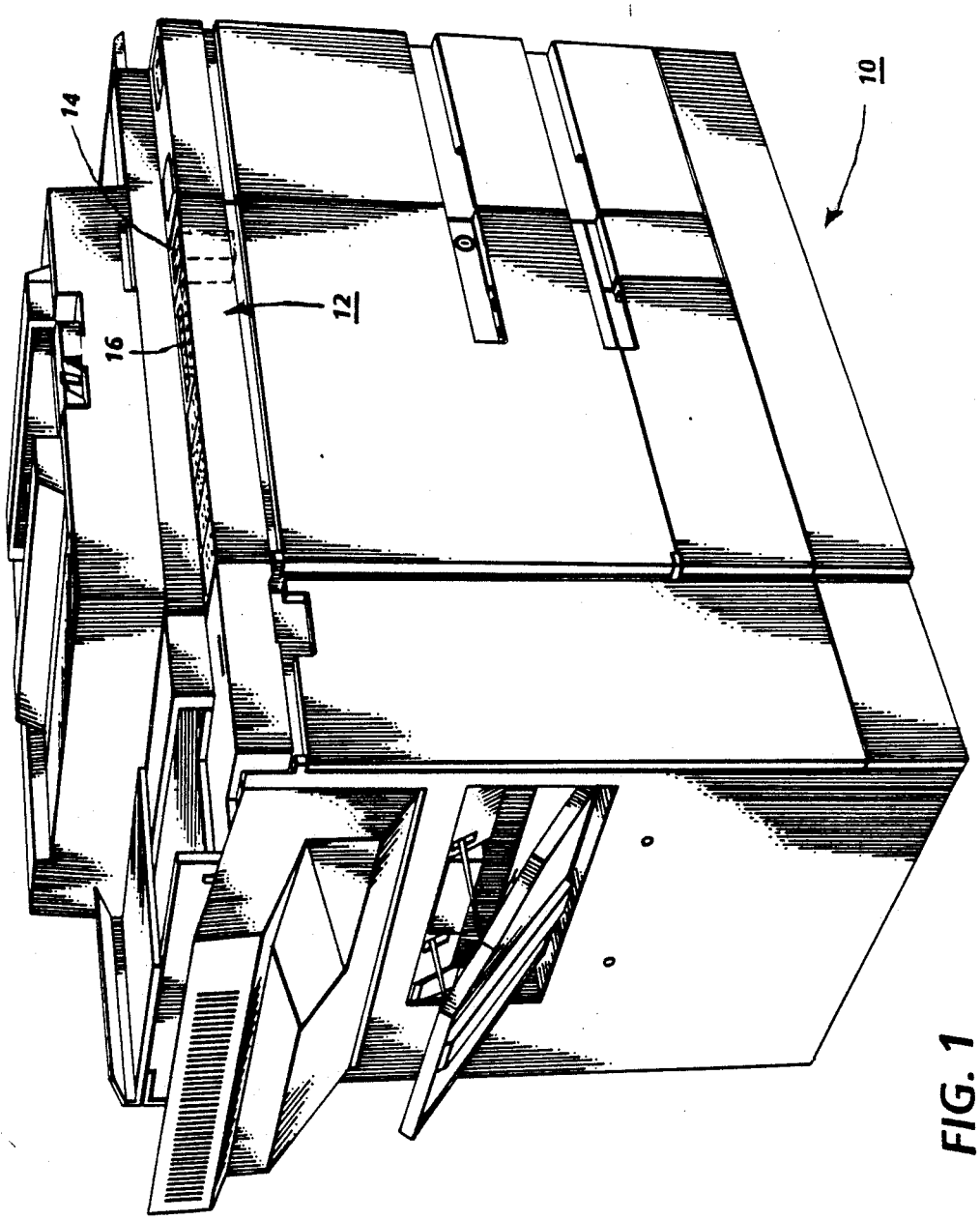
FIG. 1 is a perspective drawing showing a xerographic copier configuration.
Figure 2:
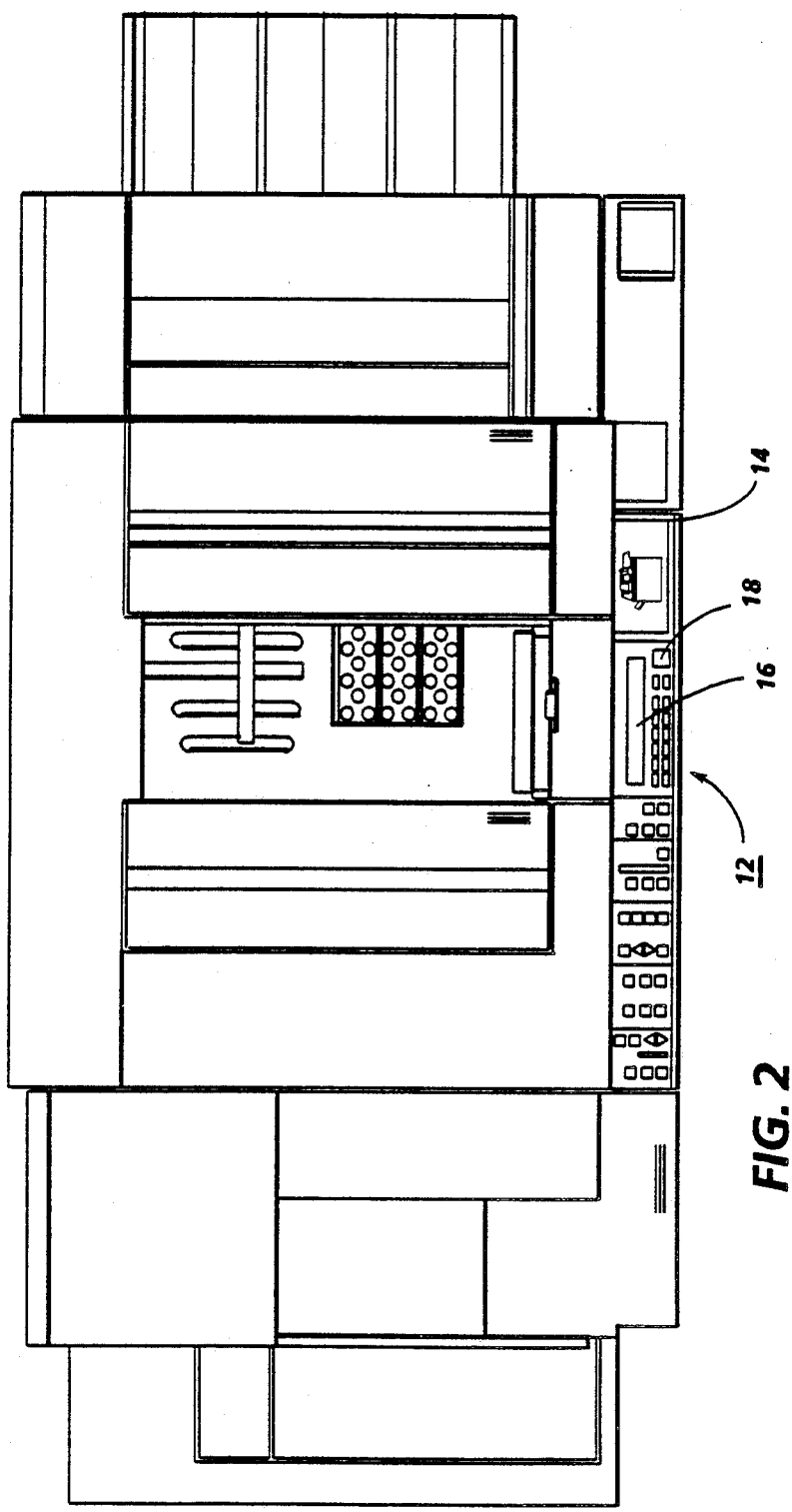
FIG. 2 is a top view of the machine shown in FIG. 1 showing a first embodiment of the holographic display module of the present invention.

For a general understanding of the features of the present invention, reference is made to the drawings. FIG. 1 schematically depicts an illustrative document reproduction machine (copier) incorporating the holographic display module of the present invention on a display panel 12. FIG. 2 shows a top view of the display panel 12 shown in perspective in FIG. 1.

The display panel 12 contains various displays which inform the user of the status of the copier and can be used to prompt the user to take corrective action in the event of a fault in copier operation. The display panel 12 includes a holographic display module 14, an alphanumeric display 16, and a "POWER ON" button 18. The present invention relates to the particulars of the display module 14 described in further detail below, which provides a visual three-dimensional picture to the user, regarding copier status and malfunctions. These visual graphic displays may be coupled with information simultaneously displayed on display 16.

As the user approaches the copier, both the holographic display and the alphanumeric display are blank. When the "POWER ON" switch 18 is activated, a "STANDBY" message will appear on the alphanumeric display 16 indicating the copier is not yet ready for use. Once the copier is ready for making xerographic copies, the alphanumeric display 16 shows a "READY TO MAKE COPIES" message telling the user the copier is ready for operation.

Figure 3:
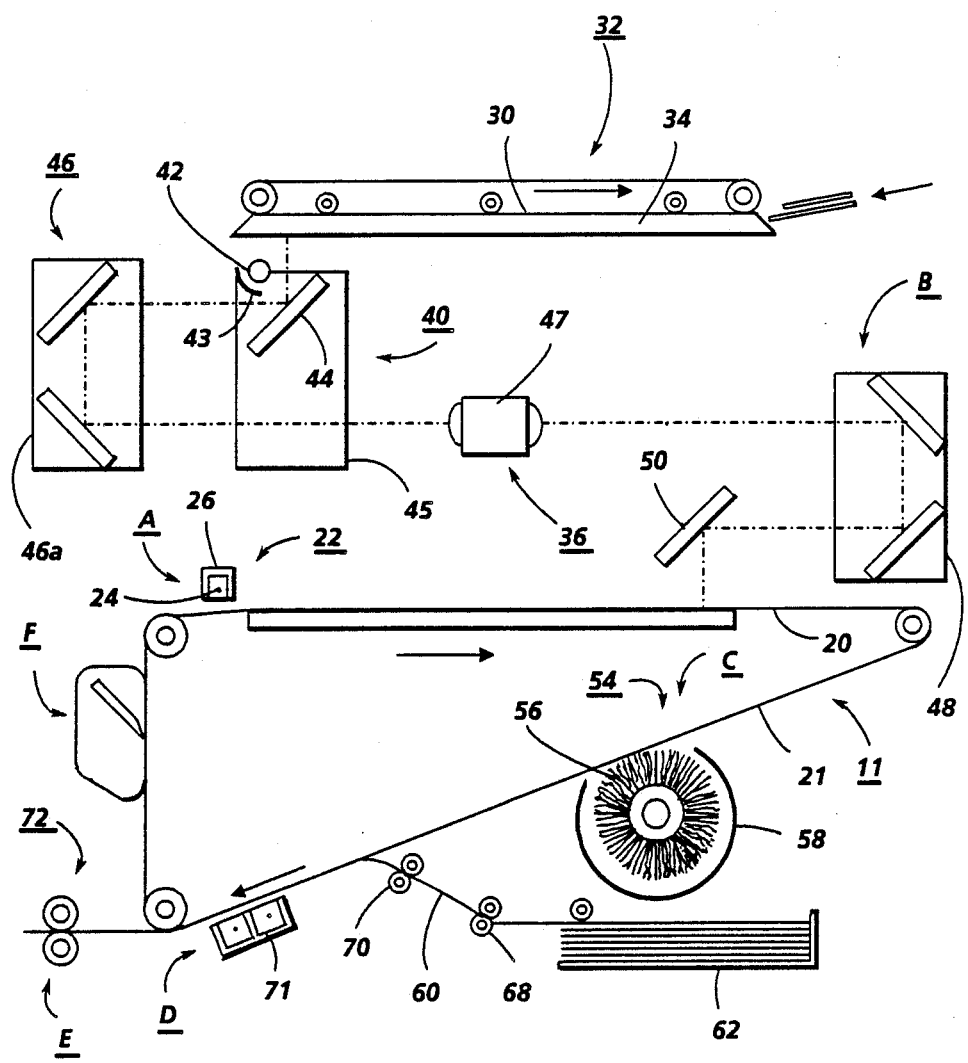
FIG. 3 is a side schematic view of the basic xerographic components incorporated within the copier.

FIG. 3 shows the basic processing stations employed in the FIG. 1 machine. As shown, the machine uses a photoreceptor belt 20 having a photoconductive surface 21 formed on a conductive substrate. Belt 20 moves in the indicated direction, advancing sequentially through the various xerographic process stations. A portion of belt 20 passes through charging station A where a corona generating device, indicated generally by the reference numeral 22, charges photoconductive surface 21 to a relatively high, substantially uniform, negative potential. Device 22 comprises a charging electrode 24 and a conductive shield 26. As belt 20 continues to advance, the charged portion of surface 21 moves into exposure station B. An original document 30 is positioned either manually, or by a document feeder mechanism 32 on the surface of a transparent platen 34. Optics assembly 36 contains the optical components which, in the fixed document mode, incrementally scan-illuminates the document from left to right and projects a reflected image onto surface 21 of belt 20. Shown schematically, these optical components comprise an illumination scan assembly 40 comprising illumination lamp 42, associated reflector 43, and full-scan mirror 44, all three components mounted on a scan carriage 45. The carriage ends are adapted to ride along guide rails (not shown) so as to travel along a path parallel to and beneath the platen. Lamp 42 illuminates an incremental line portion of document 30. The reflected image is reflected by scan mirror 44 to corner mirror assembly 46 on a second scan carriage 46a, mechanially connected to carriage 45, and adapted to move at ½ the rate of carriage 45. The document image is projected through lens 47 and reflected by a second corner mirror 48 and belt mirror 50, both moving at a predetermined relationship so as to precess the projected image, while maintaining the required rear conjugate, onto surface 21 to form thereon an electrostatic latent image corresponding to the informational areas contained within original document 30.

At development station C, a magnetic brush development system, indicated generally by the reference numeral 54, advances an insulating development material into contact with the electrostatic latent image. Preferably, magnetic brush development system 54 includes a developer roller 56 within a housing 58. Roller 56 transports a brush of developer material comprising magnetic carrier granules and toner particles into contact with the belt. Roller 56 is positioned so that the brush of developer material deforms belt 20 in an arc with the belt conforming, at least partially, to the configuration of the developer material. The thickness of the layer of developer material adhering to developer roller 56 is adjustable. The electrostatic latent image attracts the toner particles from the carrier granules, forming a toner powder image on photoconductive surface 21.

Continuing with the system description, an output copy sheet 60 taken from a supply tray 62 is moved into contact with the toner powder image at transfer station D. The support material is conveyed to station D by a pair of feed rollers 68, 70. Transfer station D includes a corona generating device 71 which sprays ions onto the backside of sheet 60 thereby attracting the toner powder image from surface 21 to sheet 60. After transfer, the sheet advances to fusing station E where a fusing roller assembly 72 affixes the transferred powder image. After fusing, sheet 60 advances to an output tray (not shown) for subsequent removal by the operator.

After the sheet of support material is separated from belt 20, the residual toner particles, and the toner particles of developed test patch areas are removed at cleaning station F. Subsequent to cleaning, a discharge lamp, not shown, floods surface 21 with light to dissipate any risidual charge remaining thereon prior to the charging thereof for the next imaging cycle.

Figure 4:
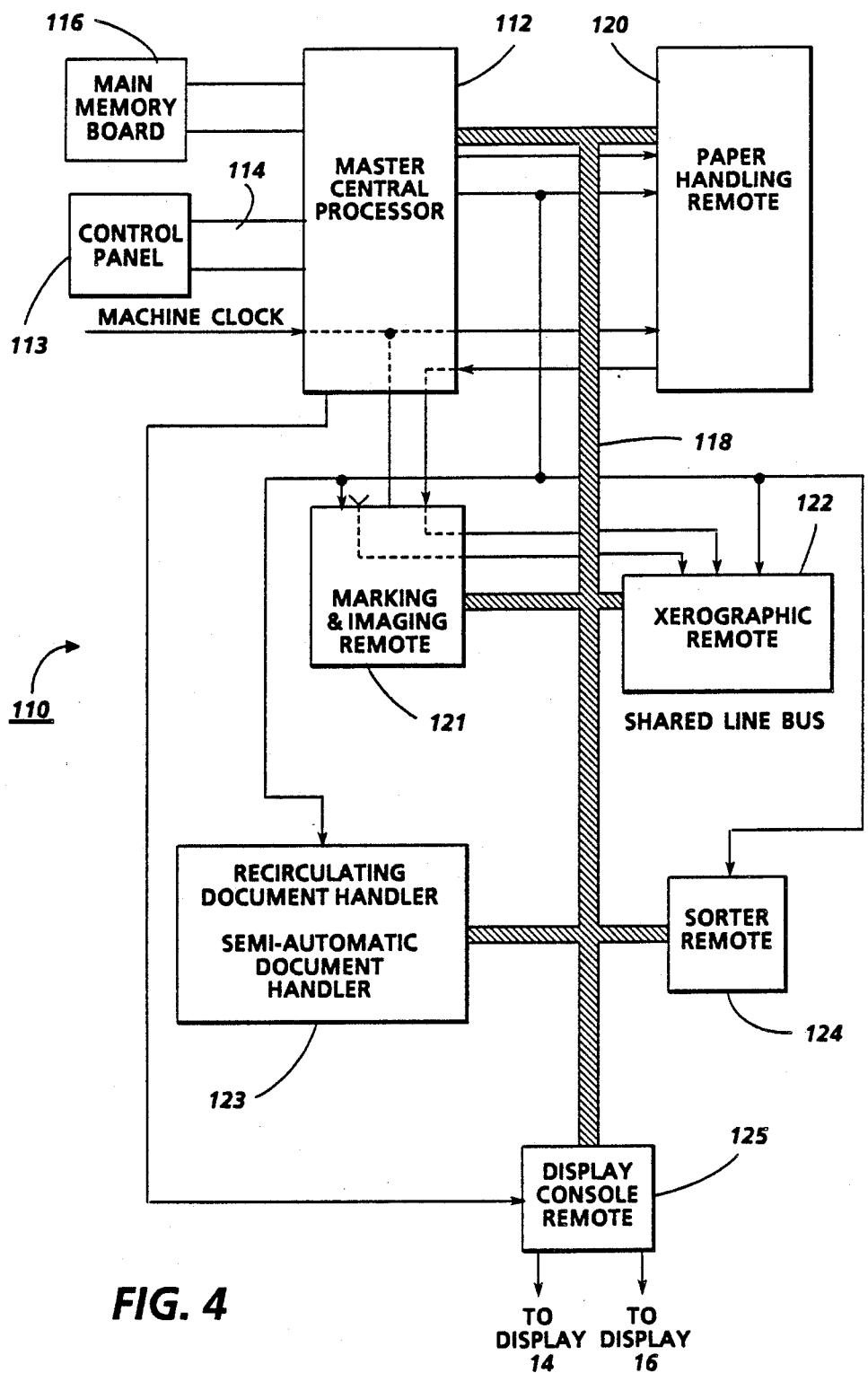
FIG. 4 is a block diagram of the control circuitry associated with the holographic display.

The functioning of the FIG. 3 components and subsystem comprising the copier 10 is controlled and monitored by an electronics subsystem 110 (FIG. 4) comprising programmable controllers which communicate with a master central processor 112. An interface 114 between a control panel 113 and main processor 112 apprises the processor 112 of inputs entered by the user regarding number of copies, etc.. The main processor 112 responds to user inputs by executing its operating system stored in a main memory unit 116.

An algorithm stored in main memory 116 causes the master central processor 112 to communicate along a communications bus 118 to a number of remote electronics units 120–125. These electronic units vary with copier architecture so the FIG. 4 schematic is representative of one of many possible electric subsystems schematics. Each unit 120–125 has its own microprocessor with accompanying memory (both RAM and ROM) and support circuitry. Further details of an exemplary remote unit are found in U.S. Pat. No. 4,475,806, whose contents are herein incorporated by reference.

The holographic and alphanumeric displays are electrically coupled to a display console remote unit 125. The display console remote unit 125 receives status information, fault information, or program control information from the main processor 112 and then displays an appropriate message on the alphanumeric display 16, and if appropriate, activate liquid crystal display elements in holographic display 14.

Figure 5:
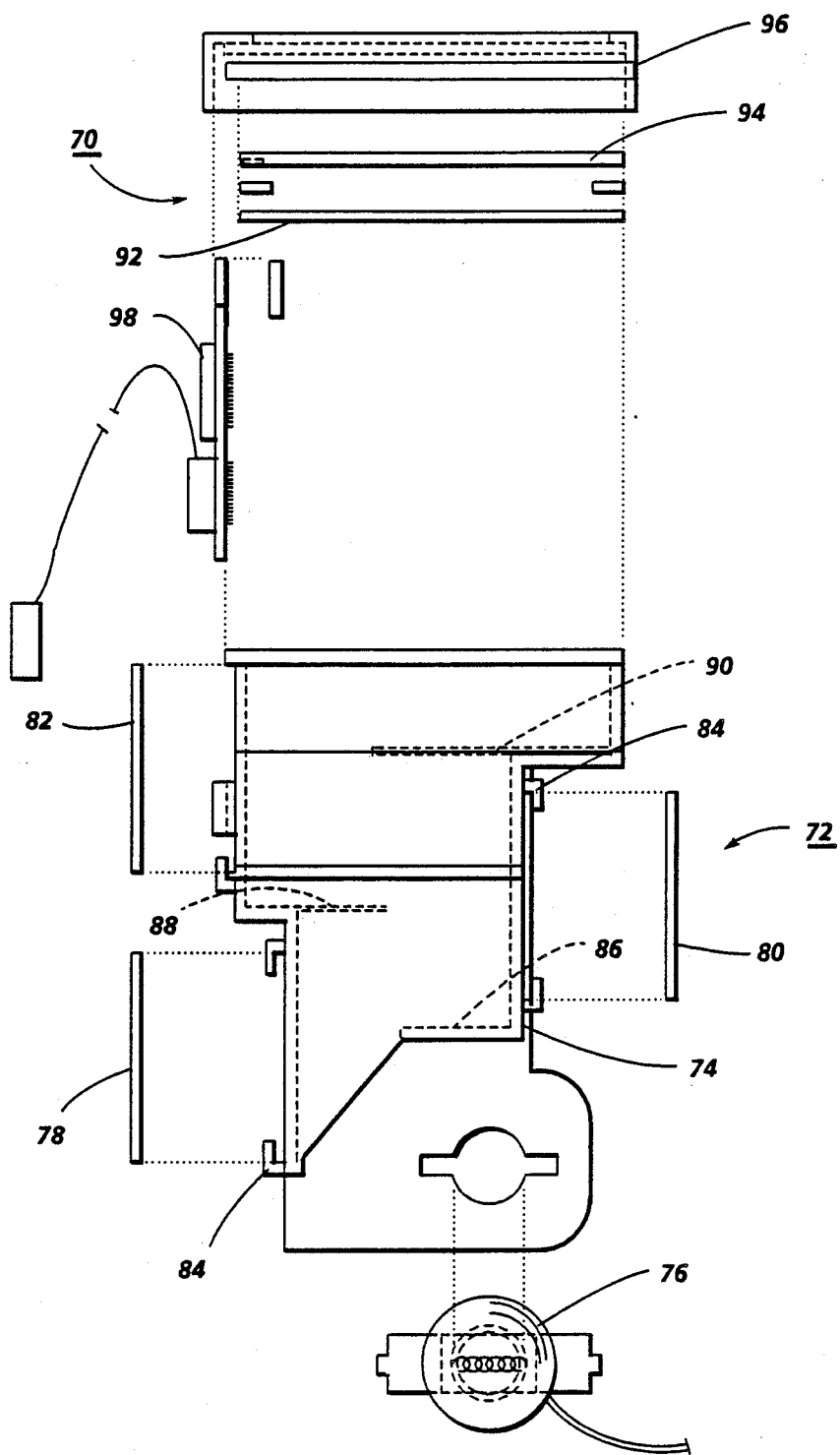
FIG. 5 is an exploded side view of one embodiment of the holographic display module.
Figure 6:
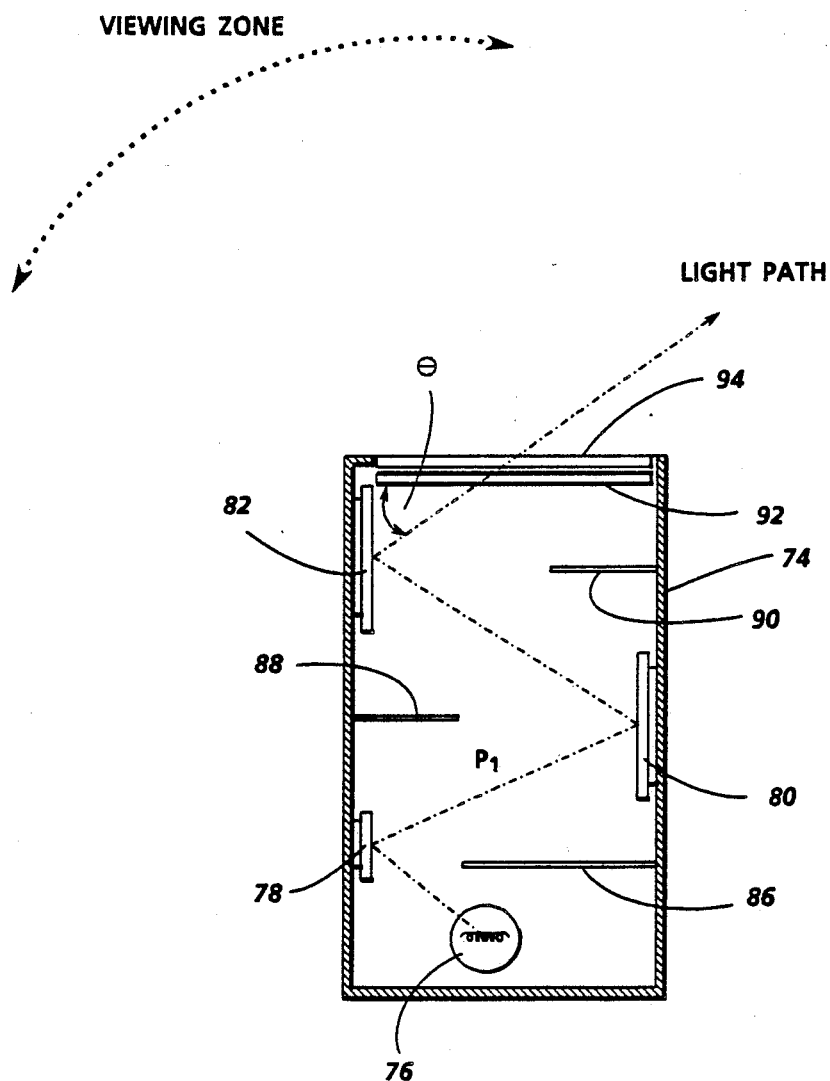
FIG. 6 is a simplified side view of the assembled holographic display module.

Referring next to FIGS. 5 and 6 there is shown an exploded view (FIG. 5) and a side view (FIG. 6) of the holographic display module 14. Module 14 comprises two subassemblies 70 and 72. Subassembly 72, which can be considered as the illumination housing, comprises a one-piece frame 74 having mounted thereon an illumination source 76 which, in the preferred embodiment, is a 12 volt auto tailgate lamp operated at about 11 volts to enhance lamp life. The interior of housing 74 is coated with a diffusely reflective paint. Lamp 76 is connected to a suitable power source which is energized coincident with the machine turn-on. A plurality of mirrors 78, 80, 82 are slideably mounted within the guideway formed by retainers 84. Baffles 86, 88, 90 control the amount of light emanating from lamp 76 along the optical path represented by a principal ray $P_1$. The lamp has an effective focal length of 150 millimeters (mm). The function of subassembly 72 is to provide a uniform band of illumination to the underside of display subassembly 70 at a carefully defined angle $\theta$ (here 55°). The positioning and number of mirrors and baffles has been optimized so only the illuminated hologram (and not the light source) are visible to an operator across the viewing zone. Subassembly 70 comprises a mimic-type, holographic plate 92 having formed therein a representation of the machine 10. Plate 92 is positioned beneath liquid crystal display panel 94. Panel 94 is mounted within display frame 96 in parallel orientation. Circuit board 98 is mounted in perpendicular orientation to panel 94 and provides the electrical interconnection between display console member unit 125 and panel 94.

The liquid crystal display panel 94 positioned directly above the holographic plate 92 includes various liquid crystal segments to aid the copier user in both interacting with the copier and correcting faults should they occur during operation. Particulars regarding liquid crystal operation are well known in the art. Exemplary descriptions are found in U.S. Pat. Nos. 4,506,956 and 4,527,864. Each liquid crystal in th display is coupled by a conductive path to an individual converter on circuit board 98. The liquid crystal elements individually, or in combination, represent a particular machine segment status. The types of segment definition which may be used, for example, are disclosed in FIG. 5 and Table 1 of U.S. Pat. No. 4,475,806.

Holographic plate 92 is, in a preferred embodiment, a transmission type film according to the technique described in "Holographic Stereograms Generated With A Liquid Crystal Spatial Light Modulator" by John L. Andrews et al.. The plate color outline is a white (neutral) but may be a specific color.

In operation, and assuming, for purposes of description, a malfunction in the paper path, the control electronics in the display console remote unit 125 receives an input from the system control representative of a problem in the particular paper path area. Unit 125 generates an output which is transmitted via circuit board 98 to the appropriate element of liquid crystal display. In this case, the area corresponding to one section of the paper path will change state, e.g., become opaque. The light output from lamp 76, therefore, passes through the transmission area of both plate 92 and display 94, but is reflected from the opaque portion of display 94. Thus, the visual image presented to the operator is a black steady (or blinking) area in the holographic image visible to the operator. Because of the three-dimensional nature of the display the operator has a clearer indication of the exact portion of the paper path being mimiced. The operator is also able to view the display at a wider viewing angle of approximately 45° as shown in FIG. 6.

Figure 7:
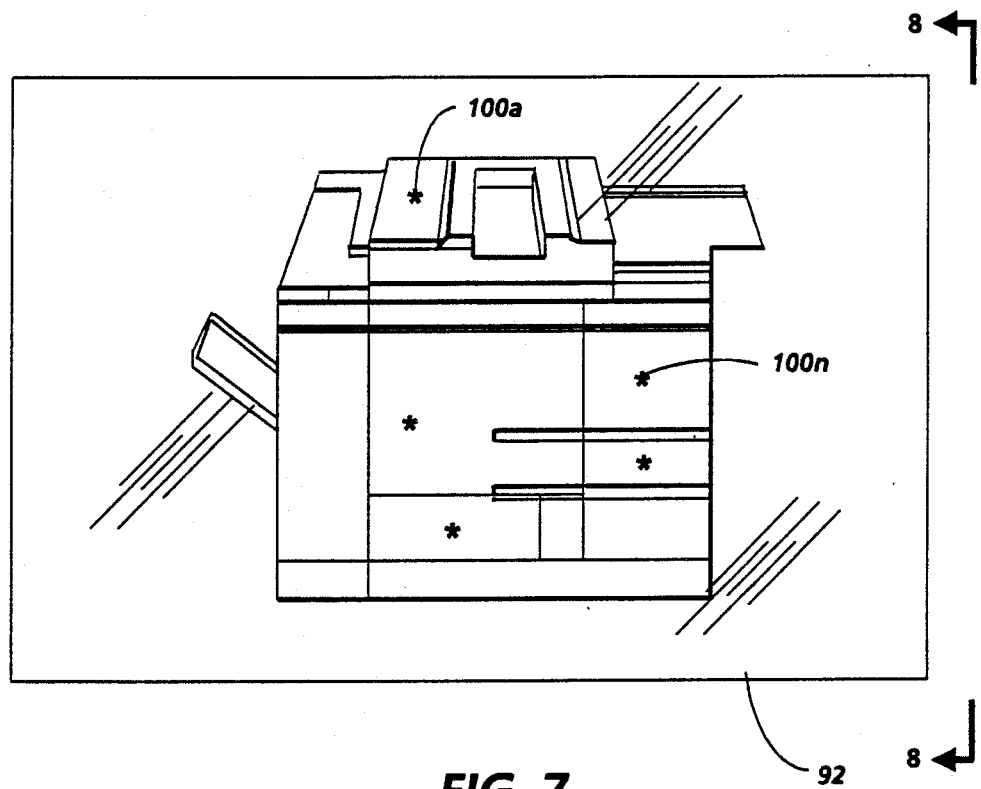
FIG. 7 is a top view of a second embodiment of a holographic display module.
Figure 8:
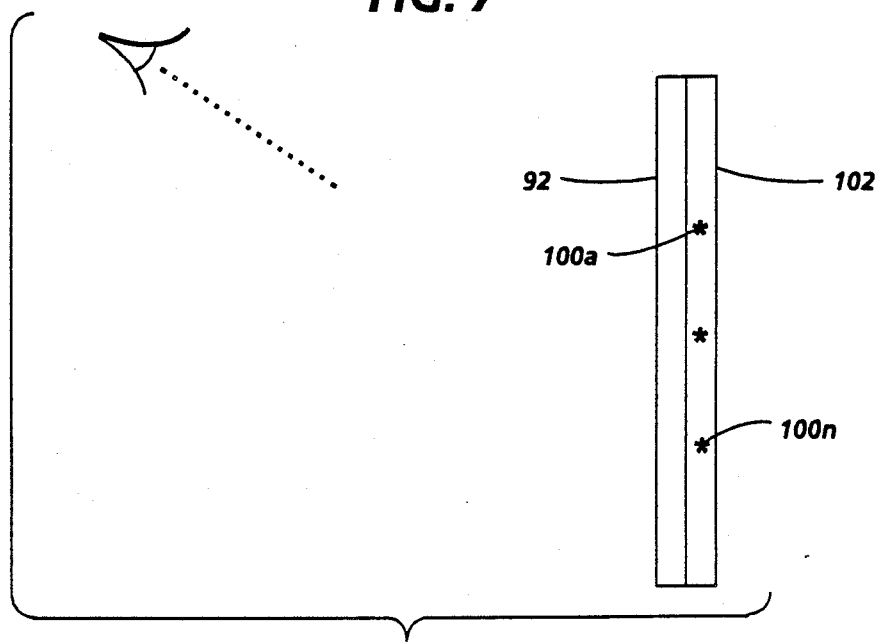
FIG. 8 is a side view of the display module of FIG. 7.

FIGS. 7 and 8 illustrate the use of a second embodiment of the invention wherein the selective illumination of areas of a machine holograph is obtained by discrete light sources. FIG. 7 shows a perspective drawing of holographic display element 14. A plurality of small light sources 100a–100n, such as light emitting diodes are mounted in a plane substrate 102 (FIG. 8). Substrate 102 can be an injection-molded plastic, a printed circuit board, or the like. Substrate 102 is mounted with respect to holographic plate 92, so that all of the positions to be highlighted are in one plane. Each light source 100 is associated with a particular location of interest within the machine. The light sources are turned on and off electronically under the control of the master control processing unit 112. If substrate 102 is transparent, a second planar substrate having additional light sources mounted thereon could be added in sandwich fashion to designate machine locations in a second plane of the hologram.

While the invention has been described with reference to a xerographic copier, the concepts are appropriate to other types of machines and are not confined to the specific details set forth. Other modifications or changes may also be contemplated as being within the scope of the invention. For example, although one liquid crystal panel has been shown in parallel with the holographic plate, two or more liquid crystal panels may be aligned in parallel with the plate. While the holographic display has emphasized the highlighting of certain machine segments, the display may also simultaneously display alphanumeric information in conjunction with the machine status.

What is claimed is:

1. In a machine having a plurality of operating subsystems, a holographic display system for providing a holographic visual display relating to the status of various machine operations, said display system comprising, in combination:
   a holographic display plate having formed thereon a holographic representation of the machine,
   at least one display panel comprising a plurality of liquid crystal, individually addressable elements, said display panel positioned parallel with, and adjacent to said holographic display plate,
   an illumination source for providing a uniform level of illumination to the holographic display plate and the display panel, and
   control circuitry for detecting a particular machine operation status and for selectively energizing the liquid crystal elements associated with the particular operation status
   whereby a corresponding portion of said holographic display plate is illuminated presenting a visual display of the particular operation status.

2. The machine of claim 1, wherein said illumination source includes a light housing comprising an illumination source, and a plurality of mirrors positioned so as to reflect the light output of said illumination source along a folded optical path.

3. The machine of claim 2, said light housing further including a plurality of light baffles.

4. The machine of claim 3, wherein the light source has an effective focal length of 150.

5. The machine of claim 2, wherein said light output is directed to the surfaces of said holographic display element at an angle $\theta$ of 55°.

* * * * *